United States Patent
Nakai et al.

(10) Patent No.: US 11,536,367 B2
(45) Date of Patent: Dec. 27, 2022

(54) SEAL STRUCTURE FOR GROMMET

(71) Applicant: SUMITOMO WIRING SYSTEMS, LTD., Yokkaichi (JP)

(72) Inventors: Hirokazu Nakai, Yokkaichi (JP); Keigo Matsushima, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/274,355

(22) PCT Filed: Aug. 20, 2019

(86) PCT No.: PCT/JP2019/032507
§ 371 (c)(1),
(2) Date: Mar. 8, 2021

(87) PCT Pub. No.: WO2020/059392
PCT Pub. Date: Mar. 26, 2020

(65) Prior Publication Data
US 2022/0049770 A1   Feb. 17, 2022

(30) Foreign Application Priority Data

Sep. 19, 2018   (JP) .............................. JP2018-174481

(51) Int. Cl.
*F16J 15/10* (2006.01)
*B60R 16/02* (2006.01)
*H01B 17/58* (2006.01)

(52) U.S. Cl.
CPC ........... *F16J 15/10* (2013.01); *B60R 16/0222* (2013.01); *H01B 17/583* (2013.01)

(58) Field of Classification Search
CPC .......... F16J 15/10; F16J 15/102; F16J 15/104; F16J 15/50; F16J 15/52; B60R 16/0222; H01B 17/583
See application file for complete search history.

(56) References Cited

U.S. PATENT DOCUMENTS

| | | | | |
|---|---|---|---|---|
| 5,973,271 | A | * | 10/1999 | Fujita ......................... F16L 5/10 174/152 G |
| 6,056,297 | A | * | 5/2000 | Harkrader ................ F16J 3/041 403/50 |
| 9,581,271 | B2 | * | 2/2017 | Haynes ...................... F16L 5/10 |
| 9,951,890 | B2 | * | 4/2018 | Haynes ...................... F16L 5/10 |

(Continued)

FOREIGN PATENT DOCUMENTS

| | | |
|---|---|---|
| JP | H09-231851 A | 9/1997 |
| JP | 2009-089587 A | 4/2009 |

(Continued)

OTHER PUBLICATIONS

Oct. 15, 2019 International Search Report issued in International Patent Application No. PCT/JP2019/032507.

*Primary Examiner* — Gilbert Y Lee
(74) *Attorney, Agent, or Firm* — Oliff PLC

(57) ABSTRACT

A seal structure that includes: a grommet with a cylindrical shape that is installed in an attachment panel, the grommet including an opposing surface facing an attachment surface of the attachment panel; and a bracket that presses the opposing surface of the grommet against the attachment surface of the attachment panel.

4 Claims, 3 Drawing Sheets

(56) References Cited

U.S. PATENT DOCUMENTS

2006/0199653 A1* 9/2006 Terashima .............. B60R 13/02
464/173
2009/0065235 A1 3/2009 Uchibori et al.
2014/0300062 A1 10/2014 Nakai
2018/0079374 A1 3/2018 Nakai et al.

FOREIGN PATENT DOCUMENTS

| | | |
|---|---|---|
| JP | 2011-200001 A | 10/2011 |
| JP | 2018-046704 A | 3/2018 |
| WO | 2013/065701 A1 | 5/2013 |

* cited by examiner

FIG. 5
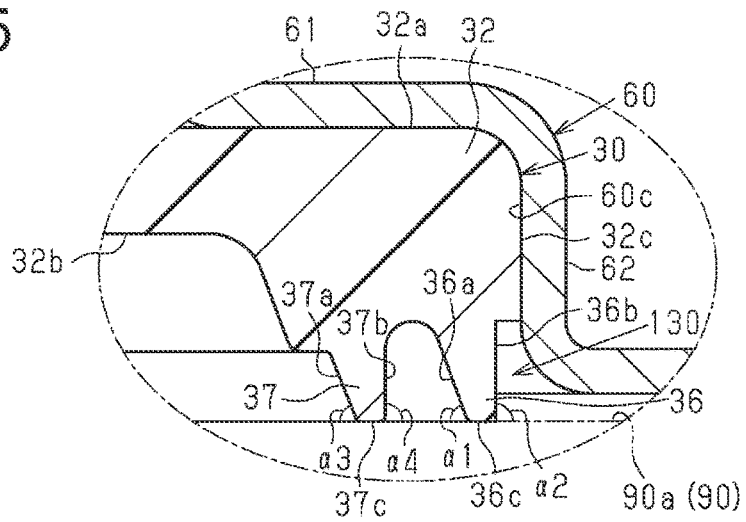
FIG. 6
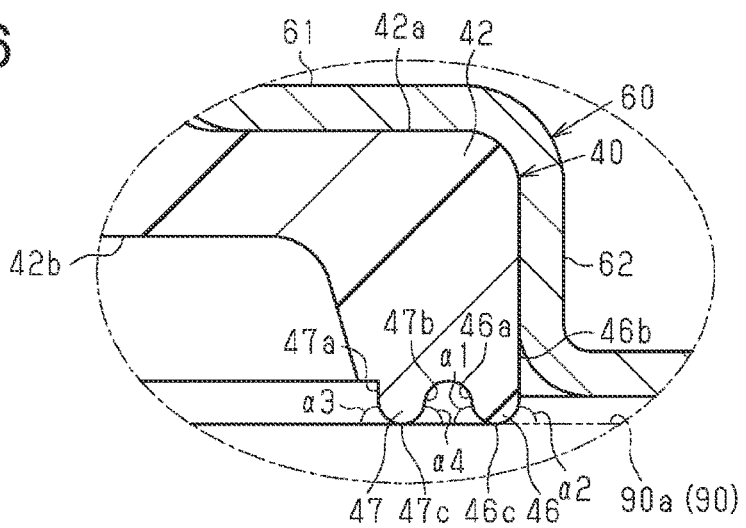
FIG. 7
| | | EXAMPLE 1 | EXAMPLE 1 | EXAMPLE 3 | COMPARATIVE EXAMPLE |
|---|---|---|---|---|---|
| WATER PRESSURE RESISTANCE (MPa) | BEFORE DETERIORATION | 16 OR GREATER | 16 OR GREATER | 16 OR GREATER | 12 |
| | AFTER DETERIORATION | 14 | 8.5 | 12 | 8 |

SEAL STRUCTURE FOR GROMMET

BACKGROUND

The present disclosure relates to a seal structure for a grommet used in a wire harness.

A known wire harness routed in a vehicle or the like is inserted in a through-hole formed in a panel of the vehicle and electrically connected to devices inside the vehicle. Such a wire harness (for example, see JP 2018-46704M is provided with a grommet for sealing the through-hole.

This type of seal structure for a wire harness is made from an elastic member and includes a cylindrical grommet into which the wire harness is inserted and a bracket that presses the grommet against a panel of a vehicle by being fasten to the panel of the vehicle. The grommet includes a cylindrical portion and a body seal portion shaped to flare from the outer circumferential surface of the cylindrical portion and to correspond to the panel. Two annular lips are disposed projecting from the surface of the body seal portion facing the panel. When the body seal portion of the grommet is pressed by the bracket, these lips are pressed against the panel of the vehicle. This forms a seal between the body seal portion and the panel.

SUMMARY

With the seal structure described above, for example, when high-pressure cleaning water is sprayed against the grommet and the panel, the water pressure may cause the lip to be lifted up, decreasing the sealing performance of the grommet. Thus, there is a demand for improvement in the sealing performance of grommets.

An exemplary aspect of the disclosure provides a seal structure for a grommet with improved sealing performance.

A seal structure according to an exemplary aspect includes: a grommet with a cylindrical shape that is installed in an attachment panel, the grommet including an opposing surface facing an attachment surface of the attachment panel; and a bracket that presses the opposing surface of the grommet against the attachment surface of the attachment panel, wherein: the grommet includes a plurality of lips with an annular shape that projects from the opposing surface toward the attachment surface and form a seal between the opposing surface and the attachment surface around an entire circumference, the plurality of lips includes an outer lip located furthest to an outer circumference side of the plurality of lips and an inner lip located inward from the outer lip, a first angle formed by an inner circumferential surface of the outer lip and the attachment surface is an acute angle, and a second angle formed by an outer circumferential surface of the outer lip and the attachment surface is greater than the first angle.

According to this configuration, regarding the outer lip, the first angle formed by the inner circumferential surface and the attachment surface is an acute angle, and the second angle formed by the outer circumferential surface and the attachment surface is greater than the first angle. Thus, a force acts on the outer lip outward in the radial direction of the grommet as a component force of the pressing force from the bracket. This force acts in the opposite direction to the flow direction of high-pressure cleaning water or the like entering between the grommet and the attachment panel. In this way, the outer lip being lifted up can be prevented. Accordingly, the sealing performance of the grommet can be improved.

In the seal structure described above, preferably a third angle formed by an inner circumferential surface of the inner lip and the attachment surface is an acute angle, and a fourth angle formed by an outer circumferential surface of the inner lip and the attachment surface is greater than the third angle.

According to this configuration, regarding the inner lip of the lip portion, the third angle formed by the inner circumferential surface and the attachment surface is an acute angle, and the fourth angle formed by the outer circumferential surface and the attachment surface is greater than the third angle. Thus, advantages and effects similar to the advantages and effects achieved via the outer lip can be achieved via the inner lip. Accordingly, the sealing performance of the grommet can be further improved.

In the seal structure described above, preferably a third angle formed by an inner circumferential surface of the inner lip and the attachment surface is an acute angle, and a fourth angle formed by an outer circumferential surface of the inner lip and the attachment surface is equal to the third angle.

According to this configuration, regarding the inner lip of the lip portion, the third angle formed by the inner circumferential surface and the attachment surface is an acute angle, and the fourth angle formed by the outer circumferential surface and the attachment surface is equal to the third angle. This means that the inner lip projects in the direction orthogonal to the attachment surface. Accordingly, the inner lip is pressed by the bracket in the direction orthogonal to the attachment surface. Also, the width of the inner lip is larger toward the base and smaller toward the end. Thus, the pressing force from the bracket is easily concentrated at the end of the inner lip. This means that the surface pressure of the inner lip tends to increase. Accordingly, the sealing performance of the grommet can be further improved.

In the seal structure described above, preferably a flat surface that faces the attachment surface is provided on an end of the outer lip and/or an end of the inner lip.

According to this configuration, the flat surface is provided on the end of the outer lip and/or the end of the inner lip. Thus, when the grommet is pressed by the bracket, the surface pressure acting on the ends of the lip portions can be made uniform. Accordingly, the sealing performance of the grommet can be further improved.

In the seal structure, preferably the grommet includes a cylindrical portion and an expanded portion with a greater diameter than the cylindrical portion joined to an end of the cylindrical portion, the opposing surface is provided on the expanded portion, an outer circumferential surface of the expanded portion is provided conforming to an inner circumferential surface of the bracket, and the outer circumferential surface of the outer lip is formed flush with the outer circumferential surface of the expanded portion.

When the bracket is attached to the grommet, a gap is formed between an inner circumferential surface of the bracket, the outer circumferential surface of the outer lip and the attachment surface. In particular, with a configuration in which the outer circumferential surface of the outer lip is located inward from the outer circumferential surface of the expanded portion, the gap tends to be large. In such a case, when the outer lip deteriorates and water enters into the gap, water pressure acts on the entire outer lip, making the outer lip vulnerable to being lifted up.

Regarding this, according to the configuration described above, the outer circumferential surface of the outer lip and the outer circumferential surface of the expanded portion are formed flush with one another. This allows the gap to be made smaller. Thus, the outer lip is resistant to being lifted up even when deteriorated. Accordingly, the sealing performance of the grommet can be improved.

According to the present disclosure, the sealing performance of a grommet can be improved.

BRIEF DESCRIPTION OF THE DRAWINGS

FIG. 5 is an enlarged cross-sectional view of a lip of a grommet of Example 3.

FIG. 6 is an enlarged cross-sectional view of a lip of a grommet of the Comparative Example.

FIG. 7 is a table showing simulation results for water pressure resistance before deterioration and after deterioration of the Examples and the Comparative Example.

DETAILED DESCRIPTION OF EMBODIMENTS

An embodiment will be described below.

Figure 1:
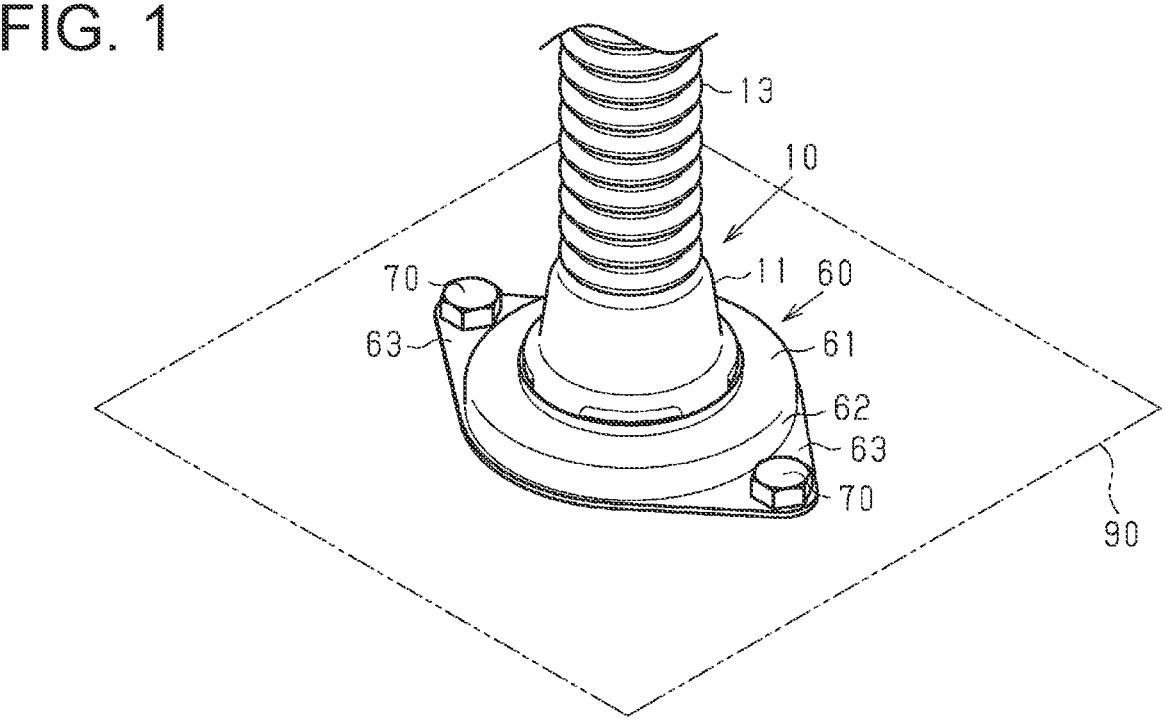
FIG. 1 is a perspective view showing a seal structure for a grommet according to an embodiment with a grommet attached to an attachment panel by a bracket.
Figure 2:
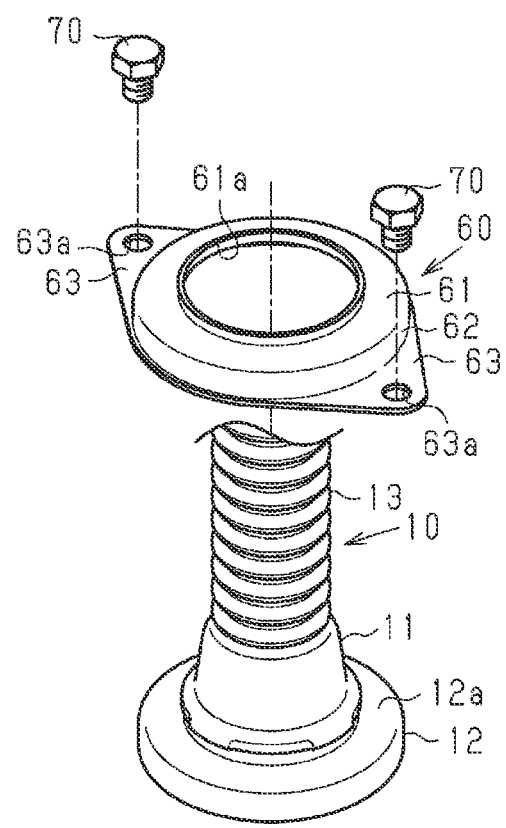
FIG. 2 is a perspective view showing the seal structure for a grommet according to the embodiment with the grommet, the bracket, and bolts separated from one another.
Figure 3:
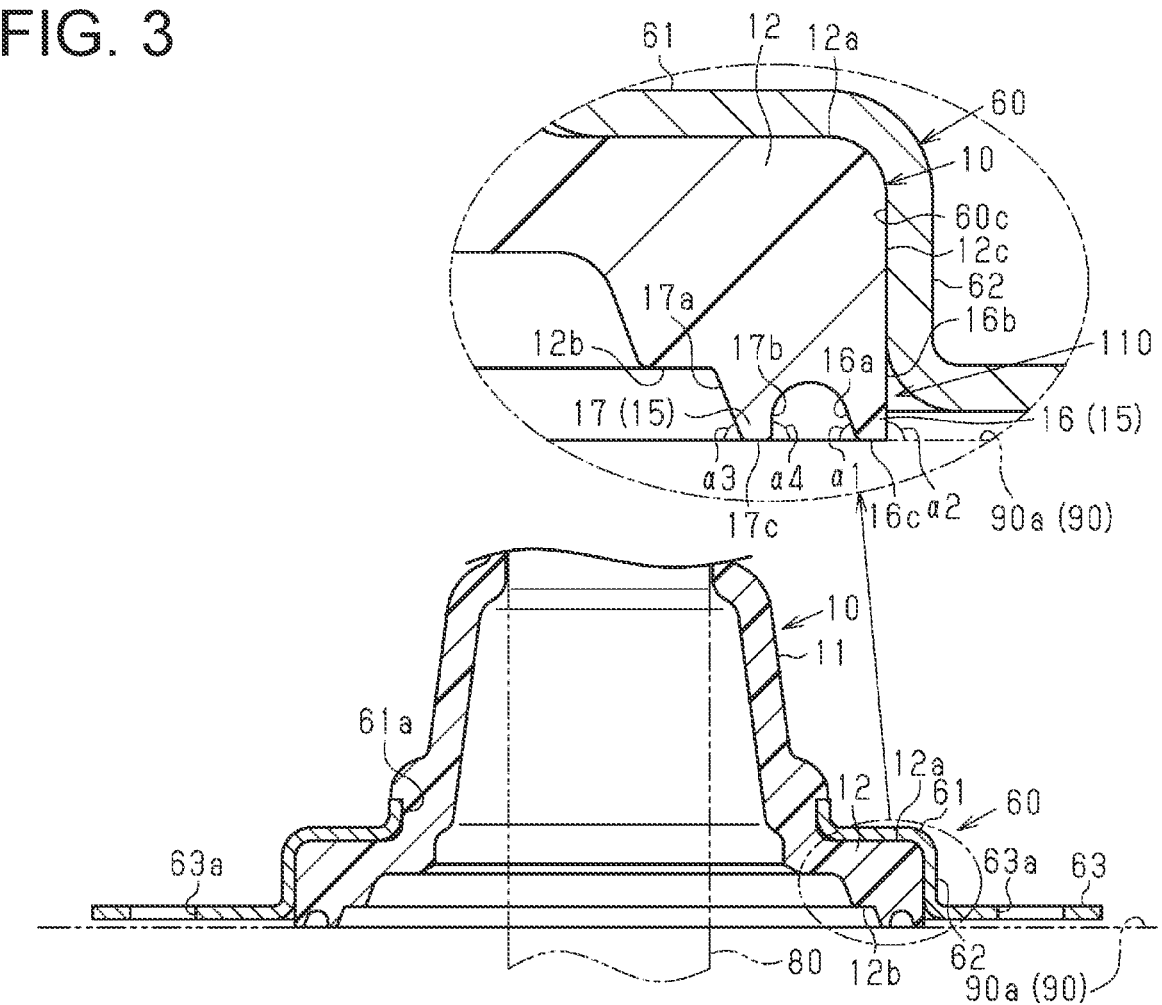
FIG. 3 is a vertical cross-sectional view showing the seal structure for a grommet according to the embodiment with grommet in a state just prior to being attached to the attachment panel by the bracket.

As shown in FIGS. 1 to 3, a grommet 10 of the present embodiment is used on a wire harness 80 inserted in a through-hole (not shown) of an attachment panel 90 that divides the inside and outside of a vehicle, for example. The grommet 10 is pressed against and fixed to an attachment surface 90a of the attachment panel 90 by a bracket 60. Note that the grommet 10 is formed from a rubber or an elastomer, for example.

The grommet 10 includes a cylindrical portion 11 with a cylindrical shape, an expanded portion 12 with a greater diameter than the cylindrical portion 11 that is joined to an end of the cylindrical portion 11, and a corrugated portion 13 joined to the other end of the cylindrical portion 11 formed with alternating ridges and grooves.

As shown in FIGS. 2 and 3, a press surface 12a that is pressed by the bracket 60 is provided around the entire circumference of the upper surface of the expanded portion 12. Note that the press surface 12a is parallel with the attachment surface 90a when the grommet 10 is attached to the attachment surface 90a.

As shown in FIG. 3, an opposing surface 12b is provided on the lower surface of the expanded portion 12, the opposing surface 12b facing the attachment surface 90a of the attachment panel 90. A plurality of lips 15 (two in the present embodiment) are provided on the opposing surface 12b, the lips 15 having an annular shape projecting toward the attachment surface 90a. Hereinafter, of the plurality of lips 15, the lip located furthest to the outer circumferential side is referred to as an outer lip 16 and the lip located inward from the outer lip 16 is referred to as an inner lip 17.

A first angle $\alpha 1$ formed by an inner circumferential surface 16a of the outer lip 16 and the attachment surface 90a of the attachment panel 90 is an acute angle. Also, a second angle $\alpha 2$ formed by an outer circumferential surface 16b of the outer lip 16 and the attachment surface 90a of the attachment panel 90 is greater than the first angle $\alpha 1$. Note that in the present embodiment, the second angle $\alpha 2$ is 90 degrees.

A third angle $\alpha 3$ formed by an inner circumferential surface 17a of the inner lip 17 and the attachment surface 90a of the attachment panel 90 is an acute angle. Also, a fourth angle $\alpha 4$ formed by an outer circumferential surface 17b of the inner lip 17 and the attachment surface 90a of the attachment panel 90 is greater than the third angle $\alpha 3$. Note that in the present embodiment, the fourth angle $\alpha 4$ is 90 degrees.

A flat surface 16c is provided on the end of the outer lip 16 and a flat surface 17c is provided on the end of the inner lip 17, the flat surfaces 16c, 17c facing the attachment surface 90a of the attachment panel 90.

As shown in FIGS. 1 to 3, the bracket 60 includes a bottom wall portion 61 that presses the press surface 12a of the grommet 10, a circumferential wall portion 62 that covers an outer circumferential surface 12c of the expanded portion 12, and a pair of flange portions 63 that project to the outer circumferential side from the lower end of the circumferential wall portion 62.

An insertion hole 61a into which the cylindrical portion 11 of the grommet 10 is inserted is centrally provided in the bottom wall portion 61.

An insertion hole 63a into which a bolt 70 is inserted is provided in the end of each flange portion 63.

The press surface 12a of the grommet 10 is pressed by the bottom wall portion 61 by the flange portions 63 being fastened to the attachment surface 90a of the attachment panel 90 by the bolts 70. This presses the lips 15 against the attachment surface 90a, forming a seal between the grommet 10 and the attachment panel 90.

Next, the effects of the present embodiment will be described.

The first angle $\alpha 1$ of the outer lip 16 and the third angle $\alpha 3$ of the inner lip 17 of the grommet 10 are acute angles, and the second angle $\alpha 2$ and the fourth angle $\alpha 4$ are greater than the first angle $\alpha 1$ and the third angle $\alpha 3$. Thus, a force acts on the outer lip 16 and the inner lip 17 outward in the radial direction of the grommet 10 as a component force of the pressing force from the bracket 60. This force acts in the opposite direction to the flow direction of high-pressure cleaning water or the like entering between the grommet 10 and the attachment panel 90 (Effect 1).

Also, the flat surfaces 16c, 17c are provided on the ends of the outer lip 16 and the inner lip 17, respectively, the flat surfaces 16c, 17c facing the attachment surface 90a of the attachment panel 90. Thus, when the grommet 10 is pressed by the bracket 60, the surface pressure acting on the ends of the lips 15 can be made uniform (Effect 2).

However, as shown in FIG. 3, when the bracket 60 is attached to the grommet 10, a gap 110 is formed between an inner circumferential surface 60c of the bracket 60, the outer circumferential surface 16b of the outer lip 16 and the attachment surface 90a. In particular, with a configuration, different from that of the present embodiment, in which the outer circumferential surface 16b of the outer lip 16 is located radially inward from the outer circumferential surface 12c of the expanded portion 12, the gap 110 tends to be large. In such a case, when the outer lip 16 deteriorates and water enters into the gap 110, water pressure acts on the entire outer lip 16. This may cause the outer lip 16 to be more likely to be lifted.

Regarding the outer lip 16 of the grommet 10 of the present embodiment, the outer circumferential surface 16b of the outer lip 16 and the outer circumferential surface 12c of the expanded portion 12 are formed flush with one another. Thus, compared to the configuration described above, the gap 110 is smaller (Effect 3).

Next, the effects of the present embodiment will be described.

1. The grommet 10 includes the annular outer lip 16 and the inner lip 17 which project from the opposing surface 12b toward the attachment surface 90a and form a seal between the opposing surface 12b and the attachment surface 90a around the entire circumference. The first angle $\alpha 1$ formed by the inner circumferential surface 16a of the outer lip 16 and the attachment surface 90a is an acute angle, and the second angle $\alpha 2$ formed by the outer circumferential surface 16b of the outer lip 16 and the attachment surface 90a is greater than the first angle $\alpha 1$. Also, the third angle $\alpha 3$ formed by the inner circumferential surface 17a of the inner lip 17 and the attachment surface 90a is an acute angle, and the fourth angle $\alpha 4$ formed by the outer circumferential surface 17b of the inner lip 17 and the attachment surface 90a is greater than the third angle $\alpha 3$.

With this configuration, Effect 1 can be achieved. Thus, the outer lip 16 and the inner lip 17 being lifted up can be prevented. Accordingly, the sealing performance of the grommet 10 can be improved.

2. The flat surfaces 16c and 17c are provided on the ends of the outer lip 16 and the inner lip 17, respectively, the flat surfaces 16c, 17c facing the attachment surface 90a.

With this configuration, Effect 2 can be achieved. Thus, the sealing performance of the grommet 10 can be further improved.

3. The outer circumferential surface 12c of the expanded portion 12 is provided conforming to the inner circumferential surface 60c of the bracket 60, and the outer circumferential surface 16b of the outer lip 16 is formed flush with the outer circumferential surface 12c of the expanded portion 12.

With this configuration, Effect 3 can be achieved. Thus, the outer lip 16 is resistant to being lifted up even when deteriorated. Accordingly, the sealing performance of the grommet can be further improved.

The following modifications can be made to the present embodiment. The present embodiment and the following modified examples can be implemented in any combination within the bounds of technical consistency.

The first angle $\alpha 1$ and the third angle $\alpha 3$ may be the same or different from one another. Also, the second angle $\alpha 2$ and the fourth angle $\alpha 4$ may be the same or different from one another.

The lips 15 of the present embodiment include the outer lip 16 and the inner lip 17. However, the grommet according to another embodiment may include a plurality of inner lips 17.

Next, the embodiment described above and modified examples thereof will be described in detail using Examples and Comparative Examples with reference to FIGS. 3 to 7. Note that Example 1 is the grommet 10 according to the embodiment described above.

The sealing performance of the grommets of Examples 1 to 3 and the Comparative Example was checked via simulation.

Figure 4:
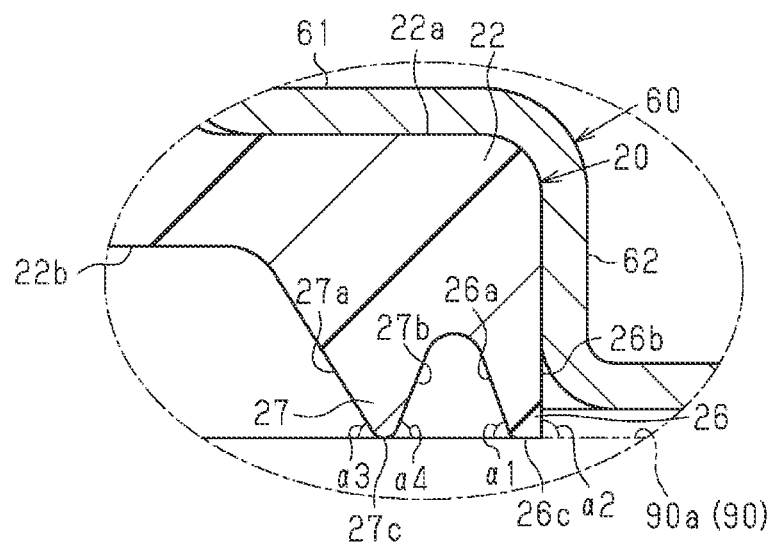
FIG. 4 is an enlarged cross-sectional view of a lip of a grommet of Example 2.

First, the shape of a grommet 20 of Example 2, a grommet 30 of Example 3, and a grommet 40 of the Comparative Example will be described. As shown in FIGS. 3 to 5, the grommets 10, 20, 30 of Examples 1 to 3 and the grommet 40 of the Comparative Example have different shapes in terms of the expanded portion and the lips. Accordingly, when describing the grommets 20, 30, 40, configurations corresponding to the grommet 10 are denoted by a reference number plus 10, 20, and 30, respectively, of the reference number of the embodiment described above, for example, 1 is 2_, 3_, and 4_, respectively. Redundant descriptions are also omitted.

Example 2

As shown in FIG. 4, in the grommet 20 of Example 2, the first angle $\alpha 1$ formed by an inner circumferential surface 26a of an outer lip 26 and the attachment surface 90a of the attachment panel 90 is an acute angle. Also, the second angle $\alpha 2$ formed by an outer circumferential surface 26b of the outer lip 26 and the attachment surface 90a of the attachment panel 90 is greater than the first angle $\alpha 1$. Note that the second angle $\alpha 2$ of the grommet 20 of Example 2 is 90 degrees. A flat surface 26c that faces the attachment surface 90a of the attachment panel 90 is provided on the end of the outer lip 26.

Also, the third angle $\alpha 3$ formed by an inner circumferential surface 27a of an inner lip 27 and the attachment surface 90a of the attachment panel 90 is an acute angle. Also, the fourth angle $\alpha 4$ formed by an outer circumferential surface 27b of the inner lip 27 and the attachment surface 90a of the attachment panel 90 is equal to the third angle $\alpha 3$. Thus, the width of the inner lip 27 (the length in the left-and-right direction in FIG. 4) is larger toward the base and smaller toward the end. The cross-sectional shape of the end 27c of the inner lip 27 is a curve.

Example 3

As shown in FIG. 5, in the grommet 30 of Example 3, the first angle $\alpha 1$ formed by an inner circumferential surface 36a of an outer lip 36 and the attachment surface 90a of the attachment panel 90 is an acute angle. Also, the second angle $\alpha 2$ formed by an outer circumferential surface 36b of the outer lip 36 and the attachment surface 90a of the attachment panel 90 is greater than the first angle $\alpha 1$. Note that the second angle $\alpha 2$ of the grommet 30 of Example 3 is 90 degrees.

Also, the third angle $\alpha 3$ formed by an inner circumferential surface 37a of an inner lip 37 and the attachment surface 90a of the attachment panel 90 is an acute angle. Also, the fourth angle $\alpha 4$ formed by an outer circumferential surface 37b of the inner lip 37 and the attachment surface 90a of the attachment panel 90 is greater than the third angle $\alpha 3$. Note that the fourth angle $\alpha 4$ of the grommet 30 of Example 3 is 90 degrees.

A flat surface 36c is provided on the end of the outer lip 36 and a flat surface 37c is provided on the end of the inner lip 37, the flat surfaces 36c, 37c facing the attachment surface 90a of the attachment panel 90.

Note that an outer circumferential surface 32c of an expanded portion 32 of the grommet 30 is provided conforming to the inner circumferential surface 60c of the bracket 60. Also, the outer circumferential surface 36b of the outer lip 36 is located inward in the radial direction of the grommet 30 from the outer circumferential surface 32c of the expanded portion 32. In this way, a gap 130 defined by the inner circumferential surface 60c of the bracket 60, the outer circumferential surface 36b of the outer lip 36, and the attachment surface 90a is made larger than the gap 110 of Example 1.

Comparative Example

As shown in FIG. 6, the grommet 40 of the Comparative Example includes an outer lip 46 and an inner lip 47, and an end 46c of the outer lip 46 and an end 47c of the inner lip 47 have a semi-circular cross-sectional shape. In the grommet 40 of the Comparative Example, the first angle α1 formed by an inner circumferential surface 46a of the outer lip 46 and the attachment surface 90a of the attachment panel 90, ignoring the end 46c of the outer lip 46, is 90 degrees, and the second angle α2 formed by an outer circumferential surface 46b of the outer lip 46 and the attachment surface 90a of the attachment panel 90, ignoring the end 46c of the outer lip 46, is 90 degrees.

Also, the third angle α3 formed by an inner circumferential surface 47a of the inner lip 47 and the attachment surface 90a of the attachment panel 90, ignoring the end 47c of the inner lip 47, is 90 degrees, and the fourth angle α4 formed by an outer circumferential surface 47b of the inner lip 47 and the attachment surface 90a of the attachment panel 90, ignoring the end 47c of the inner lip 47, is 90 degrees.

The lips of the grommets of Examples 1 to 3 and the Comparative Example described above deform when the lips are pressed against the attachment surface 90a by the bracket 60. For the sake of convenience, FIGS. 3 to 6 show a state in which the ends of the lips are abutted against the attachment surface 90a.

Next, the simulation method will be described.

First, a grommet according to Examples 1 to 3 and the Comparative Example is attached to the attachment surface 90a of the attachment panel 90, and water pressure is made to act between the lip of the grommet and the attachment surface 90a. Then, the water pressure in effect is gradually increased, and the water pressure when water enters inside the grommet from a gap between the lip and the attachment surface 90a is obtained for each lip as water pressure resistance data. This water pressure resistance is taken as the water pressure resistance before grommet deterioration.

Then, to simulate grommet deterioration, each grommet was left for a certain amount of time in a 100° C. environment in a state of bring fastened by the bracket 60. Then, the bracket 60 is removed before being fastened again to the attachment panel 90 with the bolts 70. In this state, data corresponding to the water pressure resistance is obtained via a method similar to the method described above. This water pressure resistance is taken as the water pressure resistance after grommet deterioration.

Next, the simulation result of the grommet before deterioration and after deterioration will be described.

Before Deterioration

As shown in FIG. 7, the grommets 10, 20, and 30 of Examples 1 to 3 have a water pressure resistance before deterioration of 16 MPa or greater. Also, the grommet 40 of the Comparative Example has a water pressure resistance before deterioration of 12 MPa. Note that for analytical reasons, results of the water pressure resistance that are 16 MPa or greater are treated uniformly as 16 MPa.

Regarding the outer lip 16, 36 of the grommet 10, 30 of Examples 1 and 3, the first angle α1 is an acute angle, and the second angle α2 is greater than the first angle α1. Also, regarding the inner lip 17, 37, the third angle α3 is an acute angle, and the fourth angle α4 is greater than the third angle α3. Accordingly, the Effect 1 can be achieved via the outer lip 16, 36 and the inner lip 17, 37. Also, the flat surface 16c, 36c and the flat surface 17c, 37c are provided on the end of the outer lip 16, 36 and the end of the inner lip 17, 37, respectively. Accordingly, the Effect 2 can be achieved.

Taking into account the foregoing, the grommets 10 and 30 of Example 1 and Example 3 can be considered to have a greater water pressure resistance before deterioration than that of the grommet 40 of the Comparative Example.

However, regarding the outer lip 26 of the grommet 20 of Example 2, the first angle α1 is an acute angle, and the second angle α2 is greater than the first angle α1. Accordingly, the Effect 1 can be achieved via the outer lip 26. Also, the flat surface 26c is provided on the end of the outer lip 26. Accordingly, the Effect 2 can be achieved.

Also, regarding the inner lip 27, the third angle α3 is an acute angle, and the fourth angle α4 is equal to the third angle α3. This means that the inner lip 27 projects from an opposing surface 22b in the direction orthogonal to the attachment surface 90a. Accordingly, the inner lip 27 is pressed by the bracket 60 in the direction orthogonal to the attachment surface 90a. Also, the width of the inner lip 27 is larger toward the base and smaller toward the end. Thus, the pressing force from the bracket 60 is easily concentrated at the end of the inner lip 27, and the surface pressure of the inner lip 27 is easily increased.

Taking into account the foregoing, the grommet 20 of Example 2 can be considered to have a greater water pressure resistance before deterioration than that of the grommet 40 of the Comparative Example.

After Deterioration

The grommets 10, 20, and 30 of Examples 1 to 3 have a water pressure resistance after deterioration of 14 MPa, 8.5 MPa, and 12 MPa, respectively. Also, the grommet 40 of the Comparative Example has a water pressure resistance after deterioration of 8 MPa.

A component force acting outward in the radial direction of the grommet can be considered to be acting on the lip of the grommets 10 and 30 of Example 1 and Example 3, even after deterioration. Thus, the grommets 10 and 30 of Example 1 and Example 3 can be considered to have a greater water pressure resistance after deterioration than that of the grommet 40 of the Comparative Example.

Regarding the grommet 20 of Example 2, as described above, the inner lip 27 is pressed by the bracket 60 in the direction orthogonal to the attachment surface 90a. Thus, a force is unlikely to act on the inner lip 27 in the direction opposite the direction the water pressure acts.

Taking into account the foregoing, the grommet 20 of Example 2 can be considered to have a lower water pressure resistance after deterioration than that of the grommet 10 and 30 of Example 1 and Example 3.

The gap 130 of the grommet 30 in Example 3, as described above, is larger than the gap 110 of the grommet 10 of Example 1. Accordingly, the grommet 10 of Example 1 can achieve the Effect 3.

Taking into account the foregoing, the grommet 10 of Example 1 can be considered to have a greater water pressure resistance after deterioration than that of the grommet 30 of Example 3.

The grommet of the present disclosure may also be referred to as an elastic seal element including an elastic seal surface with an annular shape or a flared shape.

The present disclosure includes the following implementation examples. Components of the embodiments are denoted with reference signs to facilitate understanding and no limitation is intended.

Supplement 1

One of more implementation examples of the present disclosure is directed at an elastic seal element (10; 20; 30) attachable to an attachment panel (90) including a through-hole, the elastic seal element (10; 20; 30) surrounding a wire (80) that extends through the through-hole of the attachment panel (90) and prevents water from entering along the attachment panel (90). The elastic seal surface (10; 20; 30) may include a center axis (the dot-dash line in FIG. 2) and an elastic seal surface with an annular shape or a flared shape that is configured to face the attachment panel (90) and surround the center axis. The elastic seal surface may include an annular radially outer lip (16; 26; 36) that includes a first annular end surface (16c; 26c; 36c) and an annular radially inner lip (17; 27; 37) that is provided radially inward from the annular radially outer lip (16; 26; 36), surrounded by the annular radially outer lip (16; 26; 36), and includes a second annular end surface (17c; 27c; 37c). When the annular radially outer lip (16; 26; 36) and the annular radially inner lip (17; 27; 37) are in a natural state not being compressed or stretched in the direction of the center axis, the first annular end surface (16c; 26c; 36c) and the second annular end surface (17c; 27c; 37c) may be aligned with a common imaginary plane (90a) orthogonal to the center axis. A first angle ($\alpha 1$) formed by an inner circumferential surface (16a; 26a; 36a) of the annular radially outer lip (16; 26; 36) and the common imaginary plane (90a) may be set as an acute angle. A second angle ($\alpha 2$) formed by an outer circumferential surface (16b; 26b; 36b) of the annular radially outer lip (16; 26; 36) and the common imaginary plane (90a) may be set to be greater than the first angle ($\alpha 1$).

Supplement 2

In one or more implementation examples, when the annular radially outer lip (16; 26; 36) and the annular radially inner lip (17; 27; 37) are in a natural state, the first annular end surface (16c; 26c; 36c) and the second annular end surface (17c; 27c; 37c) may be formed flush at the same height as seen from the direction orthogonal to the center axis.

Supplement 3

In one or more implementation examples, the annular radially outer lip (16; 26; 36) may have a right-angled trapezoidal cross-section in a cross-sectional view taken along a cross-section that is parallel with the center axis of the elastic seal element and that passes through the center axis.

Supplement 4

In one or more implementation examples, the first annular end surface (16c; 26c; 36c) of the annular radially outer lip (16; 26; 36) may be a flat surface.

Supplement 5

In one or more implementation examples, the annular radially inner lip (17; 37) may have a right-angled trapezoidal cross-section in a cross-sectional view taken along a cross-section that is parallel with the center axis of the elastic seal element and that passes through the center axis.

Supplement 6

In one or more implementation examples, the second annular end surface (17c; 37c) of the annular radially inner lip (17; 37) may be a flat surface.

Supplement 7

In one or more implementation examples, the annular radially inner lip (27) may have a triangular cross-section in a cross-sectional view taken along a cross-section that is parallel with the center axis of the elastic seal element and that passes through the center axis.

Supplement 8

In one or more implementation examples, the annular radially inner lip (27) may have an isosceles triangle cross-section in a cross-sectional view taken along a cross-section that is parallel with the center axis of the elastic seal element and that passes through the center axis.

Supplement 9

In one or more implementation examples, the second annular end surface (27c) of the annular radially inner lip (27) may be an outwardly curved surface.

Supplement 10

In one or more implementation examples, the annular radially outer lip (16; 26; 36) may have the annular shape or the flared shape uniformly formed around the entire circumference of the elastic seal surface.

Supplement 11

In one or more implementation examples, the annular radially inner lip (17; 27; 37) may have the annular shape or the flared shape uniformly formed around the entire circumference of the elastic seal surface.

Supplement 12

In one or more implementation examples, the elastic seal surface with the annular shape or the flared shape may include a single annular groove formed between the annular radially outer lip (16; 26; 36) and the annular radially inner lip (17; 27; 37).

Supplement 13

In one or more implementation examples, the elastic seal element (10; 20; 30) may be configured to come into contact with the attachment panel (90) only at a single panel surface (90a) of the attachment panel (90).

Supplement 14

In one or more implementation examples, the elastic seal element (10; 20; 30) may be detachably attached to the single panel surface (90a) of the attachment panel (90) by an annular bracket (60) and a bolt (70).

Supplement 15

In one or more implementation examples, the annular radially outer lip (16; 26; 36) and the annular radially inner lip (17; 27; 37) may be configured to press against the attachment panel (90) in the direction of the center axis at a position radially outward from the through-hole of the attachment panel (90).

Supplement 16

In one or more implementation examples, the elastic seal element (10; 20; 30) may further include a flexible, cylindrical corrugated portion (13) through which the wire (80) can be passed.

Supplement 17

In one or more implementation examples, the elastic seal element (10; 20; 30) may be a single product made from an elastic material.

It should be apparent to those skilled in the art that the present disclosure may be embodied in many other specific forms without departing from the technical spirit or scope of the disclosure. For example, some of the components described in the embodiment (or one or more variations thereof) may be omitted, or some of the components may be combined. The scope of the present disclosure is defined with reference to the appended claims along with the full scope of equivalents to which the claims are entitled.

The invention claimed is:

1. A seal structure comprising:
  a grommet with a cylindrical shape that is installed in an attachment panel, the grommet including an opposing surface facing an attachment surface of the attachment panel; and
  a bracket that presses the opposing surface of the grommet against the attachment surface of the attachment panel, wherein:
    the grommet includes a plurality of lips with an annular shape that projects from the opposing surface toward the attachment surface and form a seal between the opposing surface and the attachment surface around an entire circumference, the plurality of lips includes an outer lip located furthest to an outer circumference side of the plurality of lips and an inner lip located inward from the outer lip, a first angle formed by an inner circumferential surface of the outer lip and the attachment surface is an acute angle, a second angle formed by an outer circumferential surface of the outer lip and the attachment surface is greater than the first angle, a flat surface that faces the attachment surface is provided on an end of the outer lip and/or an end of the inner lip, the flat surface is between the outer circumferential surface and the inner circumferential surface of the outer lip and/or between an outer circumferential surface and an inner circumferential surface of the inner lip such the outer circumferential surface and the inner circumferential surface of the outer lip and/or the outer circumferential surface and the inner circumferential surface of the inner lip are spaced from each other at the end of the outer lip and/or the end of the inner lip.

2. The seal structure according to claim 1, wherein
a third angle formed by the inner circumferential surface of the inner lip and the attachment surface is an acute angle, and
a fourth angle formed by the outer circumferential surface of the inner lip and the attachment surface is greater than the third angle.

3. The seal structure according to claim 1, wherein
a third angle formed by the inner circumferential surface of the inner lip and the attachment surface is an acute angle, and
a fourth angle formed by the outer circumferential surface of the inner lip and the attachment surface is equal to the third angle.

4. The seal structure according to claim 1, wherein
the grommet includes a cylindrical portion and an expanded portion with a greater diameter than the cylindrical portion joined to an end of the cylindrical portion,
the opposing surface is provided on the expanded portion,
an outer circumferential surface of the expanded portion is provided conforming to an inner circumferential surface of the bracket, and
the outer circumferential surface of the outer lip is formed flush with the outer circumferential surface of the expanded portion.

* * * * *